H. WOOD.
BELT WHEEL.
APPLICATION FILED MAY 5, 1917.
1,244,396.
Patented Oct. 23, 1917.
2 SHEETS—SHEET 2.
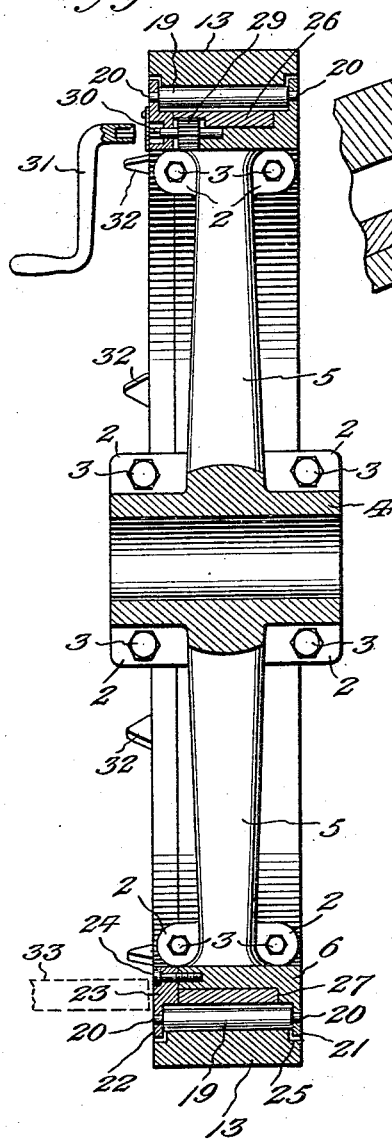
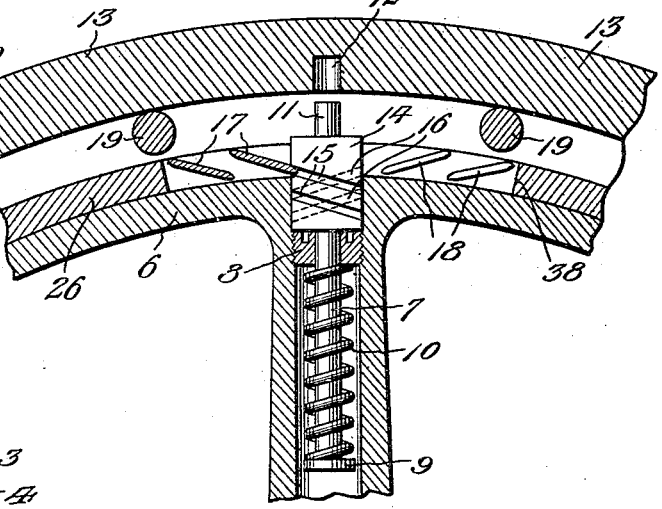
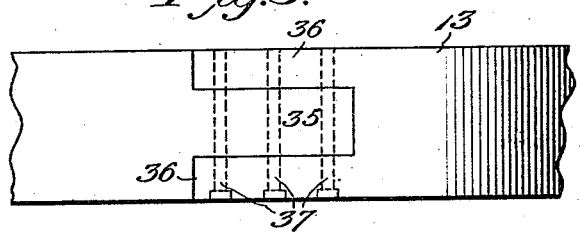
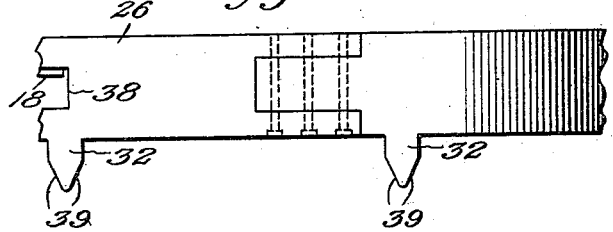
Witnesses
Edwin F. McKee
R. M. Smith
Inventor
Herbert Wood
By Victor J. Evans
Attorney

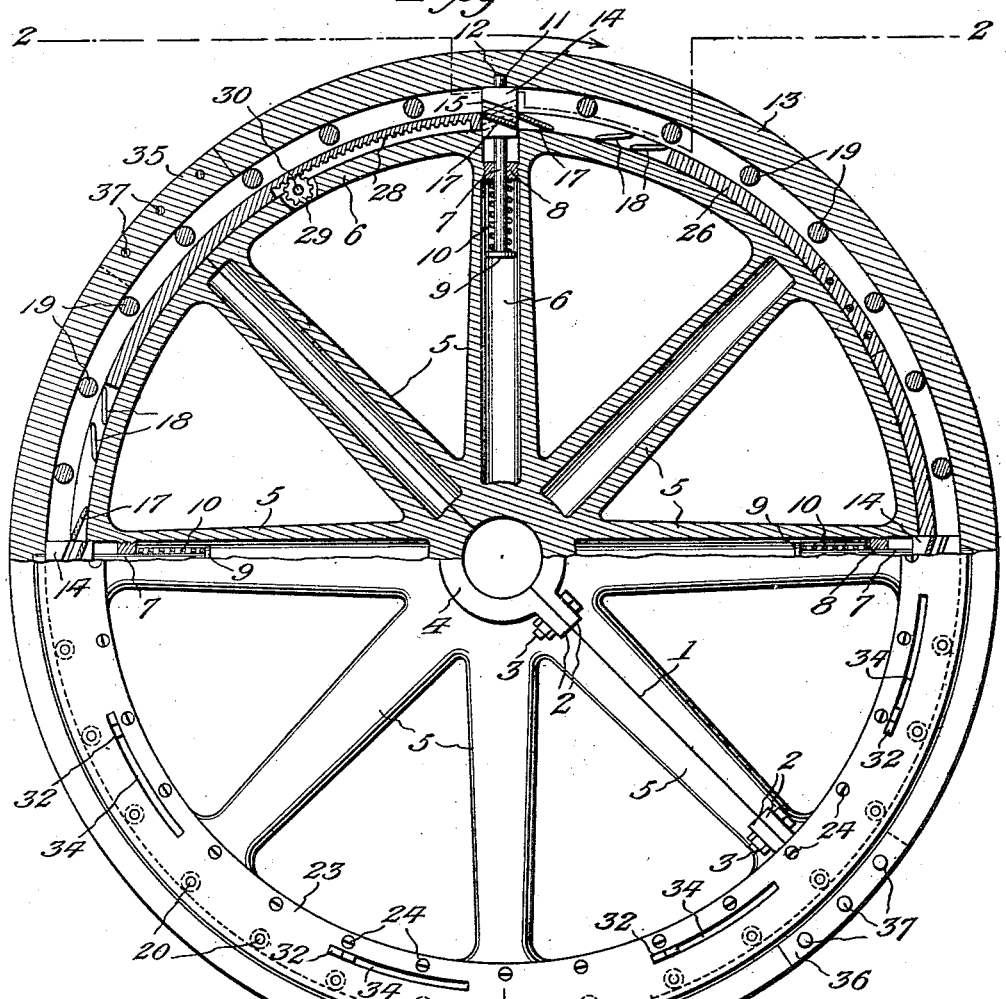

UNITED STATES PATENT OFFICE.

HERBERT WOOD, OF PHILADELPHIA, PENNSYLVANIA.

BELT-WHEEL.

1,244,396.

Specification of Letters Patent.  Patented Oct. 23, 1917.

Application filed May 5, 1917. Serial No. 166,649.

*To all whom it may concern:*

Be it known that I, HERBERT WOOD, a citizen of United States, residing at Philadelphia, in the county of Philadelphia and State of Pennsylvania, have invented new and useful Improvements in Belt-Wheels, of which the following is a specification.

This invention relates to belt wheels or pulleys, the object in view being to provide in combination with a wheel or pulley of the character referred to, a normally loose belt carrying rim which is adapted to be locked to the felly or fixed rim of the wheel and released therefrom in order that the body of the wheel may be revolved independently of the belt rim or vice versa. The broad object in view is to release the driven mechanism from the fly wheel and crank shaft of the driving engine, when occasion requires, without throwing undue strain on the engine or any part thereof.

With the above and other objects in view, the invention consists in the novel construction, combination and arrangement of parts, as herein described, illustrated and claimed.

In the accompanying drawings:—

Figure 1 is a side elevation partly in section of a wheel embodying the present invention showing the belt rim locked to the body of the wheel.

Fig. 2 is a plan view partly in section on the line 2—2 of Fig. 1.

Fig. 3 is a diametrical section through the wheel.

Fig. 4 is a fragmentary longitudinal section through the wheel, better illustrating one of the locking plungers and the operating means therefor.

Fig. 5 is a fragmentary outer face view of the belt rim.

Fig. 6 is a similar view of the locking ring.

In the preferred embodiment of this invention, the body of the wheel is diametrically split along the line 1 as indicated in Fig. 1 and provided with suitable flanges or lugs 2 to receive bolts 3 by means of which the twin sections of the wheel or pulley are fastened together.

4 designates the hub of the wheel, 5 the spokes and 6 the fixed rim or felly, all of said parts having a fixed relation to each other. The spokes 5 are of tubular construction each being formed with a central longitudinal bore 6' and in the bores of certain spokes there are mounted locking plungers 7 which are shown as slidable radially with respect to the center of the wheel through guides 8 which are threaded into the outer open ends of the bores 6'. Each plunger is provided at its inner end with a head or shoulder 9 against which bears one end of a coiled expansion spring 10 the opposite extremity of which bears against the guide 8. Therefore, the tension of the spring 10 is exerted to draw the respective locking plunger 7 inwardly so that the outer engaging extremity 11 thereof will move out of engagement with a corresponding socket 12 in the inner face of a normally loose belt rim 13 as best shown in Fig. 4.

Each locking plunger 7 is formed between its ends with an enlargement 14 preferably non-circular in cross section and formed in one side thereof with grooves 15 which are pitched or inclined in a certain direction, the enlarged portion of the plunger being provided in the opposite side thereof with other grooves 16 which are pitched or inclined in the opposite direction as indicated by full and dotted lines in Fig. 4.

Working in conjunction with the grooves or guide ways 15 and 16 just hereinabove described are plunger operating tongues, ribs or threads 17 and 18, the tongues 17 inclining in one direction to correspond with the pitch of the grooves 16, and the tongues 18 inclining in the opposite direction to correspond with the pitch of the grooves 15. Sufficient space is left between the adjacent tongues 17 and 18 to admit of the free movement of the enlarged portion 14 of the locking plunger in order that the spring 10 may act by its expansion to withdraw the outer extremity 11 of the plunger from the socket 12 in the belt rim 13.

The belt rim 13 is concentric with the fixed rim or felly 6 and is supported in relation thereto by means of anti-friction rollers 19 which, as shown in Fig. 3, are provided with end journals 20 received in bearing openings in the flange 21 of the fixed rim or felly 6 and also in a flange 22 of a detachable annular felly section 23 secured to the main body of the felly 6 by means of fasteners 24. The belt rim 13 is formed with rabbets 25 in the opposite sides thereof to receive the flanges 21 and 22 thereby preventing lateral displacement of the belt rim in relation to the fixed rim or felly.

The tongues 17 and 18 are formed integrally with a locking ring 26 which is concentric with the belt rim 13 and fixed rim 6 and located between the same and preferably resting on the fixed rim 6 which is formed with an annular recess or channel 27 in which the locking ring 26 moves for a limited distance in either direction.

The means for locking the belt rim 13 to the fixed rim 6 is illustrated in Figs. 1 and 2, the ring 26 being formed with an arcuate rack face 28 which is engaged by a pinion 29 journaled in the fixed rim as shown and preferably having its outer extremity squared as indicated at 30 to receive a detachable operating crank 31. By the means just described, the locking ring 26 may be turned sufficiently to force the locking plungers outwardly into engagement with the sockets 12 of the belt rim 13.

To provide for the instantaneous release of the belt rim 13, the locking ring 26 is provided at one side thereof with one or more projections 32 any one of which is adapted to strike against a shiftable obstruction 33 indicated by dotted lines in Fig. 3. This obstruction 33 will be under the control of the engineer who when the occasion arises may cause said obstructing member 33 to be thrown into the path of the projections 32. As soon as one of said projections strikes against the member 33, a partial rotative movement is imparted to the locking ring 26 thereby causing the locking plungers to be instantly withdrawn from engagement with the belt rim 13 by the cooperation of the tongues 17, 18 and the grooves 15, 16 of the plungers. In this way the belt rim 13 and the fixed rim 6 of the pulley or wheel are disconnected so that one may continue to revolve independently of the other which may be brought to a stop. The detachable felly section 23 is formed with arcuate slots 34 which admit of the necessary movement of the projections 33 and the locking ring 26 and limit such turning movement in either direction. The belt rim 13 and also the locking ring 26 are preferably split as indicated respectively in Figs. 5 and 6, being formed with overlapping portions 35 and 36 through which are inserted bolts 37 or equivalent fastening means. By reference to Fig. 2 it will be observed that in providing the inclined tongues 18, wherever they occur, the locking ring 26 is formed with a longitudinal slot 38 in which the enlarged portion 14 of the adjacent locking plunger is mounted, the tongues 17 and 18 being arranged at opposite sides of the slot 38 so as to engage the grooves 15 and 16 in the opposite faces of the enlargement 14 of the locking plunger.

From the foregoing description, taken in connection with the accompanying drawings, it will now be understood that preparatory to starting the engine, the belt carrying rim 13 is locked in fixed relation to the fixed rim or felly of the wheel by placing the detachable crank 31 on the outer end of the shaft of the pinion 29 and turning the latter so as to impart a partial rotative movement to the locking ring 26. The latter then thrusts outwardly all of the locking plungers 7 by the coaction between the tongues on the locking ring and the grooves in the enlargement 14 thus causing the outer ends 11 of the locking plungers to enter and be held in the sockets 12. In order to release the engagement between the belt rim and the fixed rim, the obstructing member 33 is thrust into the path of the projections 32. This will result in holding back the locking ring sufficiently to release the locking plungers which are immediately drawn inwardly by the springs 10. Each of the projections 32 is preferably beveled on both sides thereof as shown at 39 to prevent breaking off said projections during the last named operation.

I claim:—

1. In a belt wheel, the combination of a felly having a fixed relation to the body of the wheel, a belt rim concentric with and surrounding said fixed rim, slidable plungers carried by the body of the wheel and adapted to lock and release the belt rim in relation to the wheel felly, and a plunger actuating locking ring between said rim and felly.

2. In a belt wheel, the combination of a felly having a fixed relation to the body of the wheel, a belt rim concentric with and surrounding said fixed rim, anti-friction rim-supporting means carried by said felly, slidable plungers carried by the body of the wheel and adapted to lock and release the belt rim in relation to the wheel felly, and a plunger actuating locking ring between said rim and felly.

3. The combination with a fixed wheel felly, of a normally loose belt rim surrounding said felly, rim-locking plungers carried by the felly, and a plunger actuating ring carried by the felly and operating to retract and release said plungers.

4. The combination with a fixed wheel felly, of a normally loose belt rim surrounding said felly, rim-locking plungers carried by the felly, springs acting to thrust said plungers toward the rim, and a plunger actuating ring carried by the felly and operating to retract and release said plungers.

5. The combination with a fixed wheel felly, of a normally loose belt rim surrounding said felly, rim-locking plungers carried by the felly, a plunger actuating ring carried by the felly and operating to retract and release said plungers, said ring having inclined tongues, and the plungers having inclined grooves in which said tongues are slidable.

6. The combination with a fixed wheel felly, of a normally loose belt rim surrounding said felly, rim-locking plungers carried by the felly, a plunger actuating ring carried by the felly and operating to retract and release said plungers, and rack and pinion means for partially turning said ring.

7. The combination with a fixed wheel felly, of a normally loose belt rim surrounding said felly, rim-locking plungers carried by the felly, and a plunger actuating ring carried by the felly and operating to retract and release said plungers, said ring having a lateral projection adapted, upon meeting an obstruction, to hold back the ring and effect a release of the locking plungers.

In testimony whereof I affix my signature.

HERBERT WOOD.